United States Patent [19]

Shank

[11] 4,324,536

[45] Apr. 13, 1982

[54] LINK-COUPLED ROTOR ASSEMBLY

[75] Inventor: Dane G. Shank, Painesville, Ohio

[73] Assignee: Caterpillar Tractor Co., Peoria, Ill.

[21] Appl. No.: 245,234

[22] PCT Filed: May 28, 1980

[86] PCT No.: PCT/US80/00645

§ 371 Date: May 28, 1980

§ 102(e) Date: May 28, 1980

[87] PCT Pub. No.: WO81/03519

PCT Pub. Date: Dec. 10, 1981

[51] Int. Cl.³ .................. F01C 1/00; F01C 21/08; F16D 1/02
[52] U.S. Cl. ................................ 418/53; 418/270; 403/72; 403/338
[58] Field of Search .................. 418/49–53, 418/270; 403/72, 335, 338; 29/156.4 R, 463

[56] References Cited

U.S. PATENT DOCUMENTS 2,929,645 3/1960 Meckenstock ............. 403/338
3,972,657 8/1976 Clarke et al. ............... 418/53
3,982,861 9/1976 Gibson ....................... 418/53
4,011,031 3/1977 Hackett et al. ............. 418/53

FOREIGN PATENT DOCUMENTS 1551082 5/1970 Fed. Rep. of Germany ........ 418/53

Primary Examiner—John J. Vrablik
Attorney, Agent, or Firm—Wegner, Stellman, McCord, Wood & Dalton

[57] ABSTRACT

A fastening system particularly suited for securing parts of a rotor of a slant axis rotary mechanism together including links (110) abutting each of the rotor parts (60, 62), and spanning the interface (ABCD) between the parts. Pivotal nut structures (108) are journalled in the ends of the links and linear passageways (90) are disposed in the rotor parts to be nominally aligned with the nut structures. The passageways are at an acute angle to the rotor axis and terminate in a shoulder (100) at their ends remote from the nut structures. Threaded, headed fasteners have their heads (98) in operative engagement with corresponding ones of the shoulders and extend through the passageways to be threadably received by the corresponding nut structures to tension the associated links and thereby hold the rotor parts in assembled relation.

4 Claims, 3 Drawing Figures

LINK-COUPLED ROTOR ASSEMBLY

DESCRIPTION

1. Technical Field

This invention relates to a structure for coupling two abutting members together, such as parts of the rotor in a slant axis rotary mechanism.

2. Background Art

Many structures, as, for example, the rotors of slant axis rotary mechanisms, must necessarily be formed of multiple components and quite freqently will have restrictions on various geometrical shapes such that the components cannot be easily assembled using conventional fasteners. The rotors of slant axis rotary mechanisms, for example, have spherical hubs with a peripheral, radially outwardly directed flange. Typically, centrally within the hub, is an annular recess which receives the thrust collar of the mechanism shaft on which the rotor is journalled. In order to provide for cooling passages, as well as for assembly of the rotor to the thrust bearing, the rotors are made of multiple parts, usually three or more, which must be fastened together. Whatever fastening means are employed, they must be such as to not emerge from the spherical hub or interfere with the bearings journalling the rotor on the thrust collar. Similarly, they must be positioned so as to avoid interference with rotary components of the mechanism, usually the shaft.

As a consequence, various means of fabricating such rotors have been proposed as, for example, disclosed in the following U.S. Pat. 3,972,657 issued Aug. 3, 1976 to Clarke et al; 3,982,861 issued Sept. 28, 1976 to Gibson; and 4,011,031 issued Mar. 8, 1977 to Hackett et al. The rotors illustrated in the foregoing patents are quite satisfactory for their intended operational purpose in slant axis rotary mechanisms. However, there are difficulties in their fabrication. For example, the coolant passage shown in the Gibson and Hackett et al patents is formed by a large but relatively thin core during a casting process and the same is relatively difficult to remove. To avoid this difficulty, it is desirble to fabricate the rotor of but two sections, each of which roughly corresponds to a half of the rotor. The two sections would have their interface extending through coolant cavities or the like to facilitate core removal. However, this is not possible with state of the art fastener systems for such structures.

DISCLOSURE OF THE INVENTION

The present invention is directed to overcoming one or more of the problems set forth above.

According to the present invention, there is provided a structure having first and second members which are brought into abutment at a common interface with each other by moving towards each other along an axis. Links abut each of the members about the interface and span the interface with the links having first ends abutting the first member and second ends abutting the second members. Pivotal nut structures are journalled in each of the link ends and linear passageways are disposed in each of the members to be nominally aligned with the nut structures. The passageways are each at an acute angle to the axis and terminate at a shoulder at their ends remote from the corresponding nut structures. Threaded headed fasteners having their ends in operative engagement with corresponding ones of the shoulders extend through the corresponding passageways to be threadably received by the corresponding nut structures. Consequently, the links are tensioned to hold the members in assembled relation.

When applied to a slant axis rotary mechanism, the links may be disposed within the hub of the rotor radially outwardly of the thrust collar received by the hub with the heads of the fasteners being located radially inwardly so as to be well within the envelope of the spherical hub of the rotor.

Other objects and advantages of the invention will become apparent from the following specification taken in connection with the accompanying drawings.

BEST MODE FOR CARRYING OUT THE INVENTION

Figure 1:
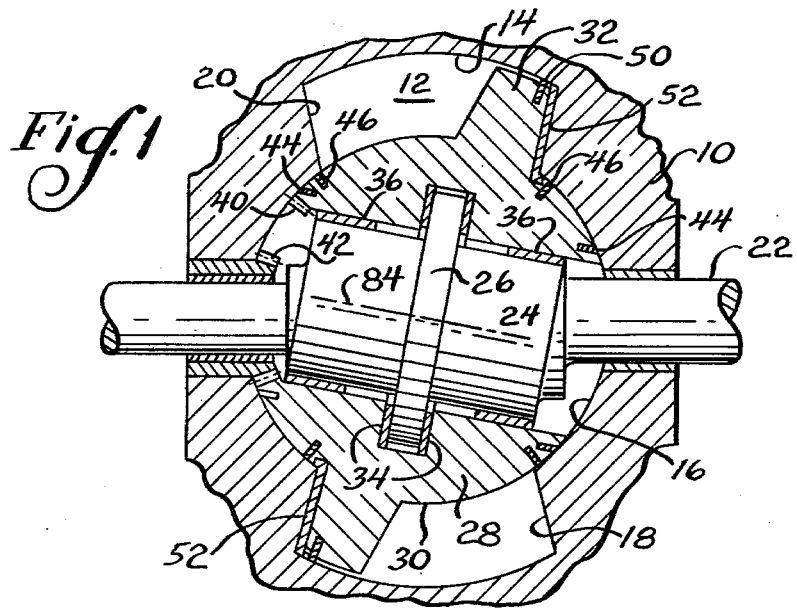
FIG. 1 is a somewhat schematic sectional view of a slant axis rotary mechanism in which the fastening structure of the present invention may be used.

A slant axis rotary mechanism with which the invention may be advantageously employed is illustrated in FIG. 1 showing only general detail sufficient to achieve an understanding of the invention. The mechanism may be used as an engine, compressor, expander, or the like as is well known. It includes a housing 10 provided with a chamber 12 which is defined by a radially outer spherical wall 14 and a radially inner spherical wall 16. The walls 14 and 16 are joined by opposed, facing, generally radially extending walls 18 and 20.

The housing 10 journals a shaft 22 for rotation and the shaft 22 includes an angularly offset eccentric 24 located substantially centrally within the chamber 12. The eccentric 24 includes a radially outwardly extending, generally centrally located, thrust collar 26. A rotor 28 is journalled on the eccentric 24 within the chamber 12 and includes a spherical hub 30 in substantial abutment with the inner spherical wall 16 and a peripheral, radially outwardly extending flange 32 which extends outwardly to the radially outer spherical wall 14. Thrust bearings 34 are interposed between the rotor 28 within the hub 30 and on opposite sides of the thrust collar 26. Journal bearings 36 are also interposed between the rotor hub 30 and the eccentric 24.

One end of the rotor 28 includes a timing gear 40 which is in mesh with a timing gear 42 concentric with the shaft 22 and usually, but not always, fixed to the housing 10.

The hub 30 carries oil seals 44 as well as compression seals 46 on both sides of the flange 32. The seals 44 and 46 sealingly engage the radially inner spherical wall 16.

On its outer periphery, the flange 32 carries peripheral seals 50 which sealingly engage the radially outer spherical wall 14.

As is well known, both sides of the flange 32 are provided with two or more apexes and at each such apex, apex seals 52 are disposed for sealing engagement with the corresponding one of the radially extending walls 18 and 20.

Inlet and outlet ports (not shown) are provided in a conventional fashion and when the mechanism is used as an engine, a means of fuel injection and/or fuel ignition, neither of which are shown, are also provided.

Dependent upon precise construction, the mechanism can be operated on two or four or more stroke principles as an engine, a compressor, an expander or the like in a conventional fashion.

Figure 2:
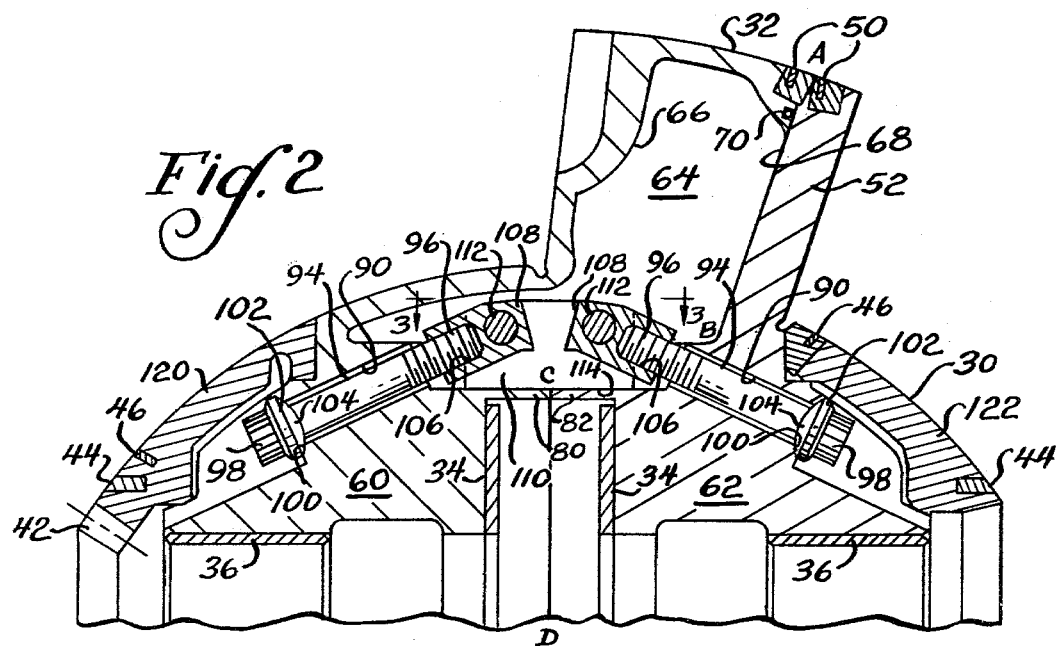
FIG. 2 is an enlarged, fragmentary sectional view of a rotor for a slant axis rotary mechanism utilizing the invention.
Figure 3:
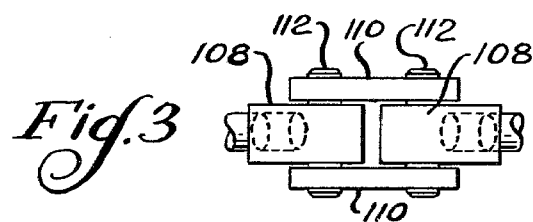
FIG. 3 is a sectional view taken approximately along the line 3—3 in FIG. 2.

Turning now to FIGS. 2 and 3, a rotor fabricated according to the invention and including fastening means made according to the invention are illustrated in greater detail. The rotor 28 is formed of two main parts 60 and 62 respectively. The parts preferably will be cast and then machine finished as necessary. The parts are essentially each one half of the total rotor as illustrated in FIG. 1 and are split along a line ABCD. The point A on the periphery of the flange 32 is actually the line of the peripheral seal 50 about the entirety of the flange 32. The flange 32 and part of the hub 30 include an inner chamber 64 for receipt of coolant in a conventional fashion and one side 66 of the chamber 64 is defined by a portion of the rotor part 60 while the opposite side 68 is formed of a portion of the rotor part 62. A seal 70 is disposed at the interface of the two to prevent leakage of coolant into the mechanism chamber 12 (FIG. 1). Depending upon the particular location about the periphery of the flange 32, the radially outer wall of the chamber 64 will be formed either by part 60, or part 62, or portions of both. The radially inner wall of the chamber 64 is formed of portions of both of the parts 60 and 62 as the line CD plainly designates.

In any event, because the interface of the parts 60 and 62 confronts the chamber 64, it will be appreciated that removal of a core therefrom after casting is readily accomplished.

Just radially outwardly of the thrust bearings 34, the rotor parts 60 and 62 may include substantially annular webs 80 and 82 respectively which abut each other at an interface defined by the line CD in FIG. 2. The rotor parts 60 and 62 are brought into abutment by movement towards each other concentrically about an axis which coincides with the cylindrical axis of the eccentric 24 and shown at 84 in FIG. 1. The axial length of the elements 80 and 82 is such as to achieve the desired tolerance interrelation between the thrust bearings 34 and thrust collar 26.

At a variety of locations about each rotor part 60 and 62, there are disposed elongated passageways 90. The passageways 90 are all at an acute angle to the assembly axis and are of sufficient size as to freely receive respective threaded fasteners 94 in the form of cap screws having threaded ends 96 and heads 98. The ends of the passageways 90 remote from the interface of the rotor parts 60 and 62 are provided with shoulders 100 for operative engagement by the heads 98 of the fasteners 94. Preferably, this engagement is not direct. Rather, the shoulders 100 are formed to have a somewhat spherical configuration and self-aligning washers 102 having mating spherical surfaces 104 surround the fasteners 94 and are interposed between the heads 98 and the shoulders 100.

The threaded ends 96 of the fasteners 94 are threadably received in threaded bores 106 of respective nut structures 108 which are nominally aligned with corresponding ones of the passageways 90, and as seen in FIG. 3, are aligned with each other. Two corresponding nut structures 108 are flanked by links 110 and are pivoted thereto by pivot pins 112 so that the nut structures 108 may rotate about a pivot axis that is parallel to the plane defined by the interface CD, the axis further being tangential to the surface of a sphere concentric with the spherical hub 30 and extending through pivot pins 112. The links 110, on one side thereof, have a surface 114 which is configured to mate with the radially outer surface of the elements 80 and 82 of the rotor parts 60 and 62 and to engage both of the rotor parts 60 and 62. In one form of the invention, the surface 114 of each of the links may be flat and mating flats located in the housing parts 60 and 62. Alternately, if desired, the two links 110 may be formed of a single link having a U-shaped cross section with the bight of the U defining the surface 114. In such a case, cylindrical recesses may be formed in the rotor parts 60 and 62. This construction provides a further degree of self-alignment in addition to that provided by the washers 102.

As can be seen in FIG. 2, the links 110 are disposed radially outwardly of the thrust collar while the heads 98 are located radially inwardly of the links 110. This enables the fastening system to extend radially outwardly to pass about the thrust collar 26 and yet have the heads 98 sufficiently radially inwardly as to be within the envelope of the hub 30 and quite remote from moving parts of the mechanism. The tension that can be applied to the links 110 by tightening of the fasteners 94 insures strong assembly.

The rotor is completed through th use of cover plates 120 and 122 on the rotor parts 60 and 62 respectively for the purpose of completely defining the spherical surface of the hub 30.

INDUSTRIAL APPLICABILITY

From the foregoing, it will be appreciated that a rotor for a slant axis rotary mechanism made according to the invention can be fabricated simply utilizing the fastening system of the invention. The fastening system is unique in its ability to transmit a tensile force "around a bend" posed by structural constraints such as the presence of the thrust collar 26 within the interior of the rotor 28 which itself constricts in size progressively as its ends are approached. Consequently, a two-part rotor structure is provided that may be easily assembled and which may have a core employed in casting the same removed easily prior to machining.

I claim:

1. A structure comprising:
   first and second members (60,62) brought into abutment at a common interface (ABCD) with each other by movement toward each other along an axis (84);
   link means (110) abutting each of said members about said interface and spanning said interface, said link means having first ends abutting said first member and second ends abutting said second member;
   pivotable nut structures (108) journalled (112) in each of said ends;
   linear passageways (90) in each of said members nominally aligned with said nut structures, said passageways each being at an acute angle to said axis and each terminating in a shoulder (100) at their ends remote from the corresponding nut structures; and
   threaded, headed fasteners (94) having their heads (98) in operative engagement with corresponding ones of said shoulders and extending through the corresponding passageway and threadably received by the corresponding nut structure to tension the corresponding link means and hold said members in assembled relation.

2. The structure of claim 1 wherein said passageways are sufficiently large to freely receive said fasteners and further including self-aligning washer means (102,104) interposed between said heads and said shoulders.

3. The structure of claim 1 wherein said link means and said members having mating surfaces (80,82, 114) at their points of engagement.

4. A slant axis rotary mechanism including the structure of claim 1 and having a housing (10) defining a chamber (12) with radially inner and outer spherical surfaces (14,16) interconnected by opposing, generally radially extending surfaces (18,20) a shaft (22) journalled in said housing and having an angularly offset eccentric (24) within said chamber, said eccentric including a radially outwardly directed thrust collar (26), a rotor (28) journalled within said chamber on said eccentric and having a generally spherical hub (30) in substantial abutment with said radially inner spherical surface and a peripheral flange (32) extending generally radially outwardly to said radially outer spherical surface, said rotor being defined by at least two (60,64) members comprising said first and second members of claim 1 and being held in assembled relation by said link means (110), said pivotal nut structures (108), said linear passageways (90), and said fasteners (94) as defined in claim 1, said link means being disposed radially outwardly of said thrust collar and the heads of said fasteners being disposed radially inwardly thereof and within said spherical hub.

* * * * *